W. E. SPARKS.
SNAP-HOOK.

No. 172,352. Patented Jan. 18, 1876.

UNITED STATES PATENT OFFICE.

WILLIAM E. SPARKS, OF NEW HAVEN, CONNECTICUT, ASSIGNOR TO W. AND E. T. FITCH, OF SAME PLACE.

IMPROVEMENT IN SNAP-HOOKS.

Specification forming part of Letters Patent No. 172,352, dated January 18, 1876; application filed November 30, 1875.

*To all whom it may concern:*

Be it known that I, WILLIAM E. SPARKS, of New Haven, in the county of New Haven and State of Connecticut, have invented a new Improvement in Snap-Hooks; and I do hereby declare the following, when taken in connection with the accompanying drawings, and the letters of reference marked thereon, to be a full, clear, and exact description of the same, and which said drawings constitute part of this specification, and represent, in—

Figure 1:
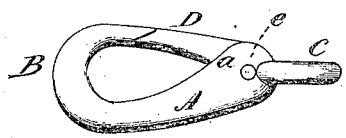
Figure 2:
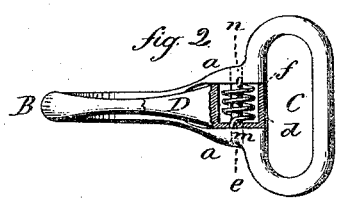
Figure 3:
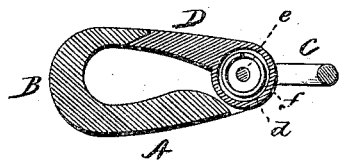

Figure 1, side view; Fig. 2, horizontal sectional plan; Fig. 3, longitudinal central section.

This invention relates to an improvement in that class of snap-hooks in which the tongue is actuated by a coil-spring around the pivot upon which the tongue turns, the object of the invention being to make a close spring-chamber to prevent the possibility of any foreign substances accummulating around the spring, or beneath the tongue, to interfere with its operation; and it consists in constructing the tongue with a concentric recess around the pivot, closed upon all exposed sides, and the shank of the hook constructed with its cheeks to receive and cover the two sides of the said chambered end of the tongue, with a transverse pivot through and concentric with the recess in the tongue, and a coiled spring within the said chamber, one end of which is attached to one of the cheeks of the shank, and the other to the tongue, so that in opening the tongue the spring will be contracted, and its reaction serve to close the tongue, as more fully hereinafter described.

A is the body of the hook, one end terminating in the hook B, the other in the loop C, in substantially the usual manner, and a recess formed between the cheeks *a a* to receive the tongue D. The rear end of the tongue D is constructed of substantially cylindrical form, and with a chamber, *d*, open only to one side, as seen in Fig. 2, the opposite side forming, as it were, a head of the cylinder. Through this head the pivot *e* is passed, concentric with the said chamber in the tongue, and so that the tongue will turn freely on the said pivot, the cheeks covering the ends or sides of the cylindrical portion of the tongue, and so as to completely close the chamber *d*, as seen in Fig. 2. Within this chamber, around the pivot, a spiral spring, *f*, is arranged, one end *n* permanently secured in the cheek of the shank, the other *m* in the head of the chamber, or other convenient point within the chamber, and so that the spring will force the tongue into its closed position, as seen in Fig. 3; hence, by depressing the tongue, the spring will be contracted or expanded, as the case may be, and the reaction serve to close the tongue. The recess between the cheeks extends through the shank, as seen in Fig. 3.

By this construction the spring is completely inclosed within the tongue, and therefore not exposed to any obstructions, or liable to any of the derangements incident to the common exposed springs.

I do not wish to be understood as broadly claiming a snap-hook having a tongue with a recess in its rear end, within which the spring is arranged, as such may be found in the patent of Charles B. Bristol, May 16, 1865; but What I do claim as my invention, and desire to secure by Letters Patent, is—

In a snap-hook, the tongue D, constructed with the close concentric spring-chamber *d*, combined with the body of the hook constructed with the cheeks *a*, between which said spring-chamber is arranged, the pivot *e* and spring *f* inclosed in said chamber, and attached by one end to one of the cheeks of the hook, and by the other to the tongue within the said chamber, substantially as described.

WILLIAM E. SPARKS.

Witnesses:
JOHN E. EARLE,
CLARA BROUGHTON.